(12) United States Patent
Lee

(10) Patent No.: US 7,702,715 B2
(45) Date of Patent: Apr. 20, 2010

(54) DIVISION ARITHMATIC UNIT OF VARIABLE RADIX

(75) Inventor: Sung Youn Lee, Gangnam-gu (KR)

(73) Assignee: Dongbu Hitek Co., Ltd., Seoul (KR)

( * ) Notice: Subject to any disclaimer, the term of this patent is extended or adjusted under 35 U.S.C. 154(b) by 1147 days.

(21) Appl. No.: 11/322,210

(22) Filed: Dec. 30, 2005

(65) Prior Publication Data

US 2006/0173949 A1 Aug. 3, 2006

(30) Foreign Application Priority Data

Dec. 31, 2004 (KR) ...................... 10-2004-0117839

(51) Int. Cl.
*G06F 7/52* (2006.01)
(52) U.S. Cl. .................................... 708/650
(58) Field of Classification Search .......... 708/650–656
See application file for complete search history.

(56) References Cited

U.S. PATENT DOCUMENTS 5,237,525 A * 8/1993 Rossbach .................... 708/655

6,549,926 B1 * 4/2003 Kalambur et al. ........... 708/650

* cited by examiner

*Primary Examiner*—Tan V Mai
(74) *Attorney, Agent, or Firm*—Lowe Hauptman Ham & Berner, LLP

(57) ABSTRACT

A variable radix divider uses dividend, divisor and quotient as division operators and includes an adder/subtractor having inputs of the dividend and the divisor. The divider further includes a first and second quotient/radix generator having inputs of the dividend and the divisor, a first multiplexer having input of the output from the first quotient/radix generator, and a second multiplexer having input of the output from the second quotient/radix generator. The first and second generators each includes a prediction adder/subtractor having inputs of bits in prediction range of the dividend and bits in prediction range of the divisor, a radix generator, and a quotient generator. The radix generator and the quotient generator have input of the output of the prediction adder/subtractor. The divider iterates a recursive cycle operation until the division operation through a feedback path to the dividend is completed. The first and second multiplexer have input of the output of the adder/subtractor and determine in advance which one is to be the quotient and which one is to be the radix with respect to potential scenarios during the adder/subtractor is in operation.

6 Claims, 2 Drawing Sheets

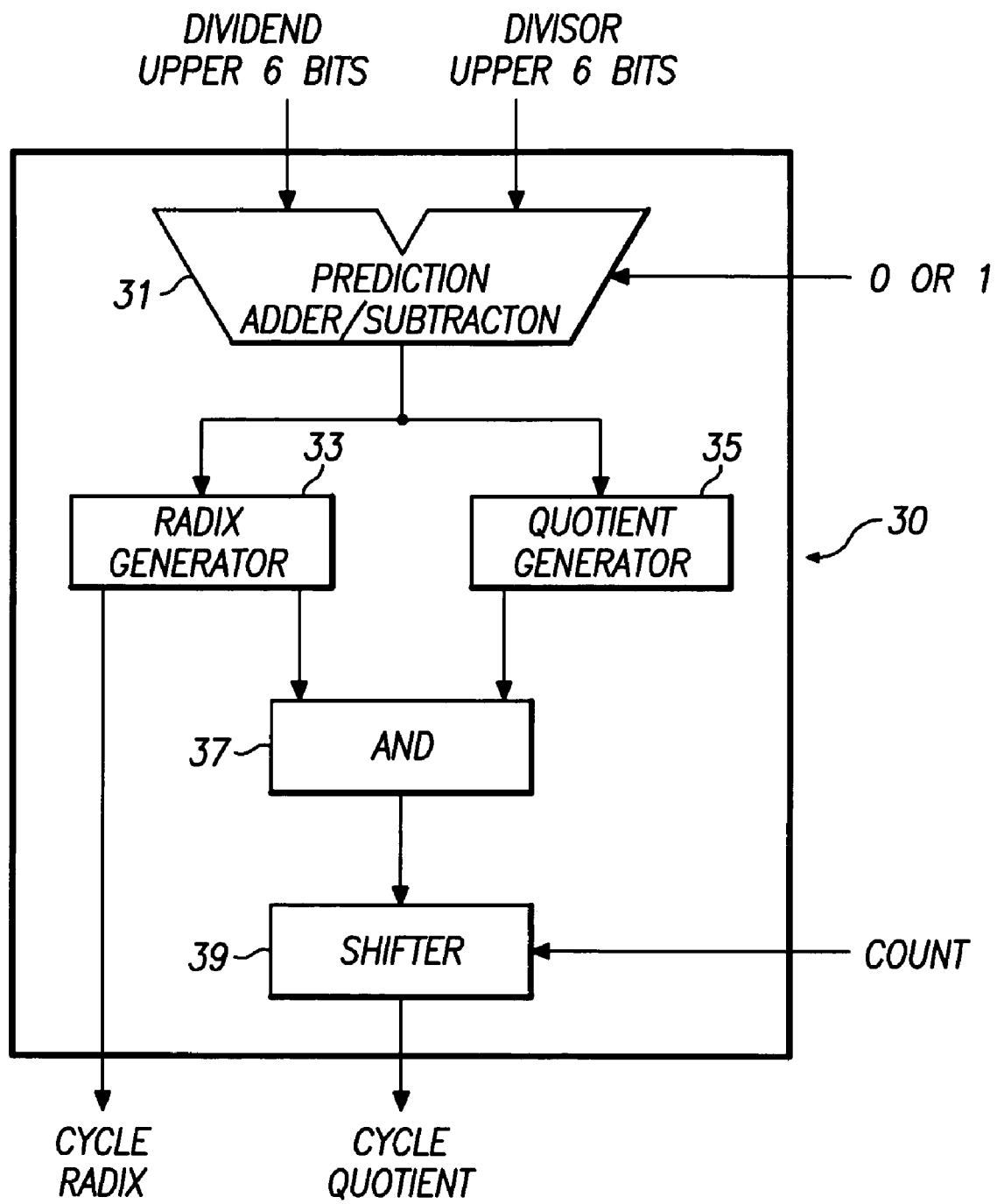

DIVISION ARITHMATIC UNIT OF VARIABLE RADIX

CROSS-REFERENCE TO RELATED APPLICATIONS

This U.S. non-provisional application claims priority under 35 U.S.C. § 119 from Korean Patent Application No. 2004-0117839, which was filed in the Korean Intellectual Property Office on Dec. 31, 2004, the contents of which are incorporated by reference herein in its entirety.

BACKGROUND OF THE INVENTION

1. Field of the Invention

The present invention relates to a division arithmetic unit. More specifically, the present invention relates to a division arithmetic unit of variable radix.

2. Description of the Related Art

In terms of signal processing, digital circuits perform binary operations, while from the structural view of circuit blocks they can carry out arithmetic operations of any base or radix 4, 10 or 16. The conventional divider is designed to determine the radix of powers of 2 such as radix-4, radix-8 and radix-16. One of the most typical dividers is a so-called SRT divider, taking its name from the initials of Sweeney, Robertson and Tocher who developed the algorithm independently at approximately the same time. The SRT division, a class of non-restoring binary division algorithm, has been designed for floating-point computation. The term "non-restoring" refers to the fact that partial remainders are allowed to range freely through the interval (−1, 1), rather than being restored to the positive realm before proceeding to the next step. The SRT division algorithm does not require addition/subtraction operations needed in the classical non-restoring division techniques, just adds a shift operation by making one bit of the quotient to be 0, and makes use of a redundant quotient digit by reducing the range of conversion condition in the classical non-restoring algorithm. By using the redundancy features, the bits of comparison constant are minimized and thus the circuit elements for determining the quotient bits are made simple.

The basic recursive equations of the SRT division algorithm are:

$$P_1 = P_0 - q_1 \cdot D_1;$$

$$P_{j+1} = r \cdot P_j - q_{j+1} \cdot D;$$

where, $p_j$ is j-th partial remainder, $p_0$ is dividend, r is radix, D is divisor, and $q_{j+1}$ is quotient bit at (j+1)-th recursive step.

The SRT divider, employed in most high performance floating-point arithmetic units, does not experience degradation of the floating-point arithmetic units due to the use of a multiplier because it is based on the subtraction operation. Typically, radix-4 SRT divider is designed and used in consideration of factors such as the physical area occupied by the circuit elements and operational clock frequency. Dividers of higher radix are employed in the field where higher performance is indispensable and require special techniques (for instance, refer to Milos D. Ercegovac, Tomas Lang and Paolo Montuschi, "Very-high Radix Division with Pre-scaling and Selection by Rounding", IEEE Trans. On Commuters, Vol. 43, No. 8, pp. 909-918, Aug. 1994).

The radix-4 division is an algorithm to obtain the quotient by accumulating 2-bit quotients per cycle for a single operation of the floating point division. However, the conventional radix-4 SRT divider requires relatively many equations, graphs and algorithms as compared to other division algorithms and it takes longer time to implement because the divider is based on tables. Furthermore, the longer operation time of the conventional radix-4 SRT divider is one of the defects.

SUMMARY OF THE INVENTION

It is, therefore, an object of the present invention to provide a divider of variable radix which is simple in circuit design.

Another object of the present invention is to provide a divider of variable radix which has higher operational frequency and makes possible quick division operation.

A variable radix divider uses dividend, divisor and quotient as division operators and comprises an adder/subtractor having inputs of the dividend and the divisor, a first quotient/radix generator having inputs of the dividend and the divisor, a second quotient/radix generator having inputs of the dividend and the divisor; a first multiplexer having input of the output from the first quotient/radix generator, and a second multiplexer having input of the output from the second quotient/radix generator. Each of the first and second quotient/radix generators includes a prediction adder/subtractor having inputs of bits in prediction range of the dividend and bits in prediction range of the divisor, a radix generator, and a quotient generator. The radix generator and the quotient generator have input of the output of the prediction adder/subtractor. The variable radix divider iterates a recursive cycle operation until the division operation through a feedback path to the dividend is completed. The first and second multiplexer have input of the output of the adder/subtractor and determine in advance which one is to be the quotient and which one is to be the radix with respect to potential scenarios during the adder/subtractor is in operation.

In an embodiment of the present invention, a prediction information is obtained in short time period by using some part of the dividend and the divisor, and it is possible to determine the radix in a simple way by detecting upper '0' string or '1' string from the prediction information. For instance, when the output carry of the adder/subtractor is determined, one of the first and second quotient/radix generators are selected.

These and other aspects will become evident by reference to the description of the invention.

BRIEF DESCRIPTION OF DRAWINGS

FIG. 2 is a block diagram illustrating the internal structure of quotient/radix generator suitable for use in the divider according to the present invention.

DETAILED DESCRIPTION OF THE INVENTION

Figure 1:
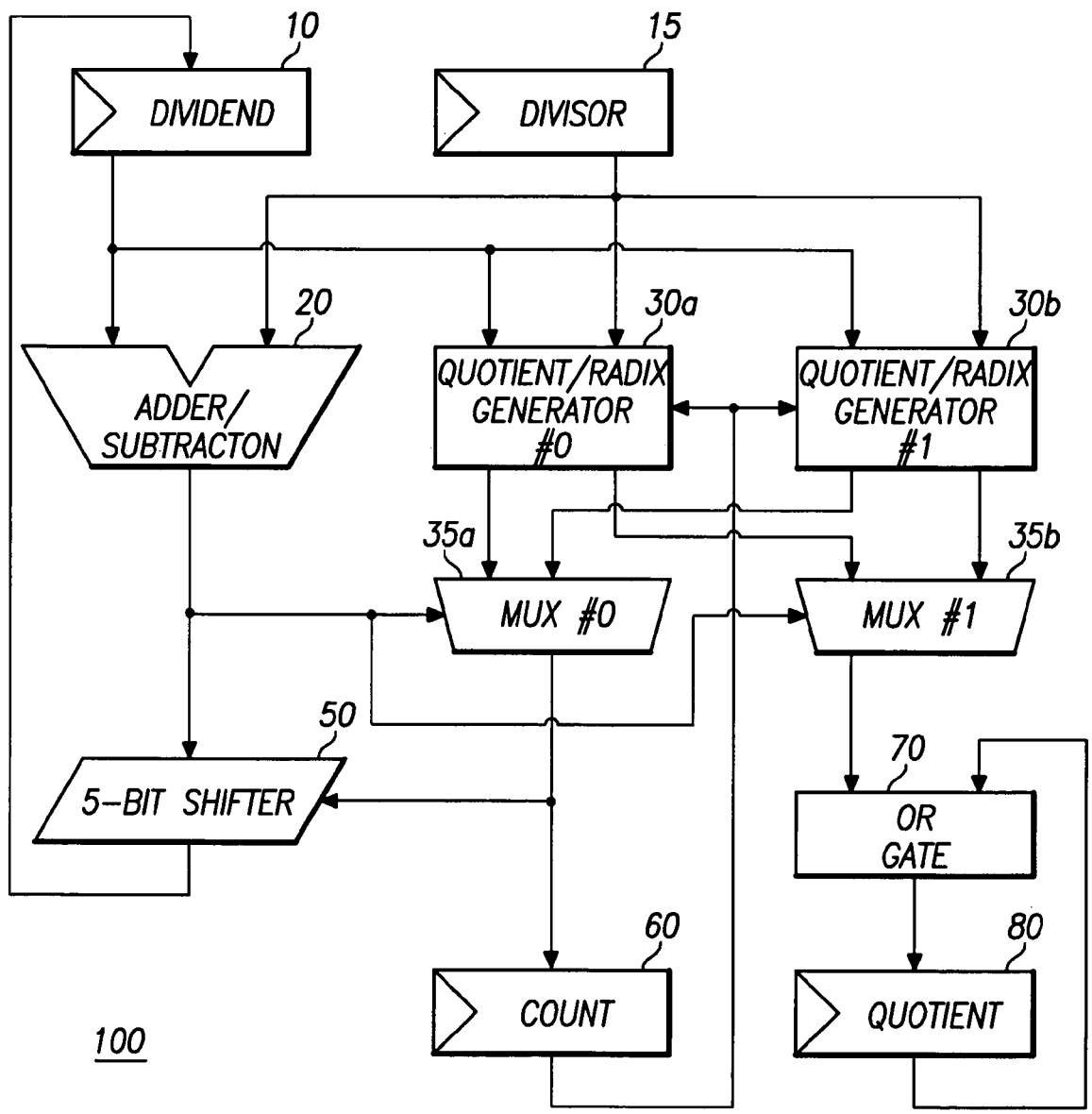
FIG. 1 is a block diagram depicting the overall structure of variable radix divider according to the present invention.

An exemplary, non-limiting embodiment of the present invention will now be described more fully hereinafter with reference to the accompanying drawings. This invention may, however, be embodied in many different forms and should not be construed as limited to the exemplary embodiment set forth herein. Rather, the disclosed embodiments are provided to more fully convey the disclosure of the invention to those skilled in the art. The principles and features of this invention may be employed in varied and numerous embodiments without departing from the scope of the invention.

FIG. 1 is a block diagram showing the structure of variable radix divider according to the present invention.

Referring to FIG. 1, the divider 100 according to an embodiment of the present invention employs dividend 10, divisor 15 and quotient 80 as the division operators, and includes adder/subtractor 20, first quotient/radix generator 30a, second quotient/radix generator 30b, first multiplexer 35a, second multiplexer 35b, OR gate 70, count 60, and shifter 50.

The adder/subtractor 20 performs addition or subtraction operation to the inputs of the dividend 10 and divisor 15, and outputs its operation result to the shifter 50, which can be implemented in 5-bit shifter. The output of the shifter 50 is feedback to the dividend 10. The output of the adder/subtractor 20 is also provided to the first and second multiplexers 35a and 35b.

The dividend 10 and divisor 15 are also input to the first and second quotient/radix generators #0 and #1 (30a and 30b). Output of the first quotient/radix generator 30a enters into the first multiplexer 35a, and the output of the first multiplexer 35a becomes the count that is feedback to the first and second quotient/radix generators 30a and 30b. Output of the second quotient/radix generator 30b is input to the second multiplexer 35b, the output of the second multiplexer 35b is input to the OR gate 70, and the output of the OR gate 70 becomes the quotient 80. Then, the quotient 80 is feedback to the input of the OR gate 70.

The divider 100 of FIG. 1 performs recursive (iteration) cycle (iteration cycle) operations until the division is completed through the path by which the data and quotients are feedback to the dividend. Further, during the operation of the adder/subtractor 20, the first and second quotient/radix generators 30a and 30b determine, with regard to two possible or potential scenarios, what the quotient will be and what the radix is to be. When the operation of adder/subtractor finishes, one of the scenarios is selected according to the determined sign, the selected quotients are accumulated, and the selected radix is used for the general control of the divider 100. The selection of the scenario is made by multiplexers 35a and 35b. By constructing the divider in this way, the overall operation time can be reduced. In known configuration, the generation of the quotient and radix begins from the partial remainder after the addition/subtraction operations are completed. However, this path requires much delay. In the present invention, two quotient/radix generators 30a and 30b are provided, and two possible paths are calculated beforehand, so that one of the results from the addition/subtraction operations, which corresponds to the calculated paths that is chosen.

In the divider 100 of FIG. 1, the OR gate 70 accumulates the selected quotients, and the selected bit string length (radix) is added to the count 60. The count 60 informs when the recursion has to be finished according to the precision. The partial remainder is shifted left by the bit string length of the radix by the count 60 and then becomes the partial dividend in the next cycle.

FIG. 2 is a block schematic diagram showing the internal structure of quotient/radix generator suitable for use in the divider according to the present invention.

Referring to FIG. 2, the quotient/radix generator 30 includes prediction adder/subtractor 31, radix generator 33, quotient generator 35, AND gate 37, and shifter 39. In the prediction adder/subtractor 31, most-significant six bits are input as the detection range of divisor. The output of the prediction adder/subtractor 31 is input to the radix generator 33 and the quotient generator 35, and outputs of the radix generator 33 and the quotient generator 35 are ANDed to be input to the shifter 39. The output of the radix generator 33 becomes the cycle radix and the output of the shifter 39 becomes the cycle quotient.

The quotient/radix generator 30 shown in FIG. 2 produces in a short time period the prediction information by using just parts of the dividend and divisor, and it is possible to determine the radix by simply detecting the upper 0 string or the upper 1 string from the prediction information.

The prediction adder/subtractor 31 has an input carry that has not yet been determined, and therefore two prediction adder/subtractors are provided for calculating in advance each case of '0' and '1' (one for the first quotient/radix generator and the other for the second quotient/radix generator).

The following relation shows the case when the lengths of the operand and partial remainder are set to be 56-bits for manipulation of the effective numbers:

$\{sb_s b_0 \cdot b_1 b_2 b_3 b_4\} \leftarrow \{C_{OUT}, B_5 B_6 \ldots B_{51} B_{52} B_E\}$; 56-bit addition/subtraction, where the parameter 's' denotes the sign of the partial remainder, and the parameter '$b_s$' is an extended bit for representing the situation of the divisor becoming twice (i.e., when coefficient "2" is multiplied to the divisor). The parameter '$B_E$' is an extended bit for representing the divisor being reduced to ½. The position represented by 'b' is calculated by two prediction adder/subtractors, and portions denoted by 'B' is calculated by 49-bit adder/substractors. The parameter 's' has the same value as the parameter '$b_s$', and thus is obtained by reproduction of the '$b_s$'.

The radix generator 31 and the quotient generator 35 produce each of the quotient and radix by using the 6-bit values that have been calculated previously by the prediction adder/subtractor 31. At this stage, the adder/subtractor 20 in FIG. 1 operates simultaneously. When the output carry of the adder/subtractor 20 is determined, one of two results of the two parallel blocks, which is correct, is selected on the basis of the output carry.

Further, the prediction adder/subtractor 31 provides the prediction information for the radix generator 33 that produces a quotient mask and a bit string length using the provided prediction information. The quotient mask is used in limiting the length of the quotient, and the bit string length is employed in the count 60 and 5-bit shifter 50 in FIG. 1. The bit string length is accumulated in the count 60, and used in determining the terminating point of the cycle operation. The quotient mask is an AND mask like the bit string length. In other words, the quotient mask is ANDed with the quotient to leave the portions within the bit string length and remove the other portions. This means that the quotient mask is to make the length of the quotient to be the same as the bit string length.

The quotient generator 35 produces the quotient by applying quotient determination rule to the prediction information of the adder/subtractor 31. In an embodiment of the present invention, two quotient determination rules are employed: rule 1 is to make the first bit of the quotient (q) to be "NOT" of the sign of the partial remainder; and rule 2 is to make the additional quotients to be remaining bits that exclude the most significant bits from the bit string. The quotient determination rule 1 is the same as the non-restoring scheme and, further to this, an additional quotient is determined by the rule 2, thereby increasing the quotient length. Normally, the rule 1 is applied to q[4], while the rule 2 is applied to q[3:0]. For exceptional conditions, the following determination rules are applied:

(1) When the coefficient is "2", the rule 2 is applied to q[4:3] because the rule 1 is applied to 1-bit upper bits;

(2) When the coefficient is "½", the rule 1 is applied to 1-bit lower bit q[3], while the rule 2 is applied to q[4];

(3) In case of excess, the rule 2 is applied to q[4:3] because the determination of quotient for all of the cycles continues; and (4) When q[2:0], the rule 2 is always applied.

The following table shows the examination result of the performance of variable radix divider 100 according to the present invention.

| Examination Items | Conventional Radix-4 SRT | Variable Radix of the Present Invention |
|---|---|---|
| Computation Amount per Cycle (bit) | 2 | 2.54 (Average) |
| IEEE Standard Division (Cycle) | 28 | 22.3 (Average) |
| Cycle Time (nano second) | 5.5 | 5.5 |
| Total Operation Time (nano second) | 5.5 · 28 = 154 | 5.5 · 22.3 = 122.7 |

In the table above, the IEEE standard division refers to "An American National Standard, IEEE Standard for Binary Floating-Point Arithmetic, ANSI/IEEE Std. 754, 1985".

As seen from the table above, the variable radix divider of the present invention can reduce the operation time by about 20% when compared with the conventional SRT divider.

Further, according to the present invention, the prediction information can be obtained in short time period by only using parts of dividend and divisor, and it is possible to simply and swiftly determine the radix by detecting the upper 0 string or 1 string from the prediction information. Moreover, in the present invention, the selection of potential scenarios is made in advance during the operation of adder/subtractor so that the overall operational time of the divider can be reduced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A variable radix divider employing dividend, divisor and quotient as division operators and comprising:
   an adder/subtractor having inputs of the dividend and divisor;
   a first quotient/radix generator having inputs of the dividend and the divisor;
   a second quotient/radix generator having inputs of the dividend and the divisor;
   a first multiplexer having input of output from the first quotient/radix generator;
   a second multiplexer having input of output from the second quotient/radix generator; and
   each of the first and second quotient/radix generators including: a prediction adder/subtractor having inputs of bits in prediction range of the dividend and bits in prediction range of the divisor; a radix generator; and a quotient generator, the radix generator and the quotient generator having input of output of the prediction adder/subtractor;
   wherein the variable radix divider iterates a recursive cycle operation until division operation through a feedback path to the dividend is completed, the first and second multiplexer have input of the output of the adder/subtractor and determine in advance which one is to be the quotient and which one is to be the radix with respect to potential scenarios during the adder/subtractor is in operation.

2. The divider of claim 1, wherein output from the radix generator in the first and second quotient/radix generators becomes a cycle radix, and each of the first and second quotient/radix generators includes: an AND gate for performing AND operation to the output of the radix generator and the output of the quotient generator; and a shifter having input of the output from the AND gate and having a cycle quotient of output of the shifter.

3. The divider of claim 1 further comprising a shifter connected to the output of the adder/subtractor and a count connected to the output of the first multiplexer, and wherein the output of the first multiplexer is input to the shifter, the output of the count is input to the first and second quotient/radix generators, and the output of the shifter is feedback to the dividend.

4. The divider of claim 1 further comprising an OR gate connected to the output of the second multiplexer, and wherein output of the OR gate becomes the quotient and the quotient is feedback to the OR gate.

5. The divider of claim 1, wherein one of the first quotient/radix generator and the second quotient/radix generator is selected when an output carry for the adder/subtractor is determined.

6. The divider of claim 1, wherein the quotient generator in the first and second quotient/radix generators produce the quotient by applying a first determination rule which makes the first bit of the quotient to be "NOT" of sign of partial remainder and a second determination rule which makes an additional quotient to be remaining part of a bit string excluding the most significant bit.

* * * * *